UNITED STATES PATENT OFFICE 2,362,439

LACTONES OF THE CYCLOPENTANOPOLY-HYDROPHENANTHRENE SERIES AND PROCESS OF MAKING SAME

Leopold Ruzicka, Zurich, Switzerland, assignor to Ciba Pharmaceutical Products Inc., Summit, N. J., a corporation No Drawing. Application April 29, 1942, Serial No. 441,035. In Switzerland June 12, 1941

18 Claims. (Cl. 260—239.5)

The aglucones of vegetable cardiac poisons and of toad poisons are derivatives of the cyclopentanopolyhydrophenanthrene series characterized by containing a side chain with an unsaturated $\gamma$ or $\delta$ lactone group. The position and number of the double bonds do not seem to be definitely fixed. Thus, until recently, the formulation as $\beta,\gamma$-unsaturated lactones (see for example Fieser, Chemistry of natural products related to Phenanthrene, New York 1936, page 262) was customary for the group of digitalis and strophanthus aglucones, whereas recently their formulation as $\alpha,\beta$-unsaturated lactones has become more prominent. (See Paist, Blout, Uhle and Elderfield, J. Org. Chem., vol. 6, page 273, 1941; Helv. Chim. Acta 25, 79, 1942). Scillaridine A and the toad poison aglucone Bufotalin, on the other hand, are assumed to possess a doubly unsaturated $\delta$-lactone group (cf. however Fieser, page 310, according to which Bufotalin contains a simple $\gamma,\delta$-unsaturated $\delta$-lactone group).

Experience has now shown that lactones of the cyclopentanopolyhydrophenanthrene series can be obtained by allowing compounds of the latter series which have in the nucleus a substituent of the formula

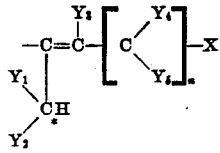

(the * indicates a carbon which is in $\alpha$-position with respect to the double bond.)

or a side chain which contains such a substituent, wherein X is a free carboxyl group or a functional derivative thereof, $Y_1$ to $Y_5$ stand for hydrogen atoms and/or hydrocarbon radicals, such as alkyl radicals, and $n$ has the value 0, 1 or 2, to react with oxidizing agents capable of introducing into the $\alpha$-position with respect to a double bond oxygen, a free hydroxyl group or a group which upon hydrolysis is converted into a hydroxyl group, and treating the products of the reaction, if desired, with hydrolyzing agents or if necessary with such agents as are capable of converting a group —CO— into the group CY(OH), wherein Y is a hydrogen atom or alkyl radical, and finally with lactonizing or re-esterifying agents.

The unsaturated acids of the steroid series which are used as starting materials can easily be prepared, for example, by condensation of suitable ketones of this series with halogenized fatty acid derivatives, such as chloro-, bromo- or iodo-acetic acid esters, $\alpha$- or $\beta$-bromopropionic acid esters, $\alpha$- or $\beta$-bromoisobutyric acid esters or valeric acid esters, methylethylbromoacetic acid esters, methyl-[$\alpha$-brom-ethyl]- or methyl-[$\alpha$-brom-ethyl]-acetic acid esters, $\alpha$- or $\beta$-bromoisovaleric acid esters or bromotrimethylacetic acid esters, and elimination of water. They are also obtainable, for example, by bromination of the corresponding saturated acids and elimination of hydrogen bromide. Suitable starting materials are, for example, $\Delta^{20,22}$-3-acetoxy-norcholenic acid methyl ester, $\Delta^{4,5;20,22}$-3-keto-21-methyl-nor-choladienic acid ethyl ester or $\Delta^{4,5;20,22}$-3-acetoxy-21,22-dimethyl-nor-choladienic acid ethyl ester (or corresponding derivatives of cholenic acid or 25-homo-cholenic acid), $\Delta^{22,23}$-3-acetoxy-22-methyl-21-nor-cholenic acid methyl ester, $\Delta^{20,22}$-3,7,12-tri-acetoxy-cholenic acid ethyl ester or a corresponding nor-cholenic acid ester, analogous 3,7- or 3,12-diacyloxy-acid esters or, for example, the corresponding free acids, amides or nitriles.

Oxidizing agents, which are capable of introducing into the $\alpha$-position with respect to a double bond in a known manner oxygen, a free hydroxyl group or a group which upon hydrolysis is converted into a hydroxyl group, (e. g. hydroxyl groups esterified with carboxylic acids or with hydrohalic acids), are, for example, selenium dioxide, chromic acid, lead tetra-acylate and halogens or iodoso compounds. Treatment with these agents is carried out in suitable solvents or diluents, heating if necessary. In order to convert substituted hydroxyl or carboxyl groups into free hydroxyl or carboxyl groups, the compound may further be treated with hydrolyzing agents, whereby it is possible by careful manipulation to hydrolyze only partially the several saponifiable substituents which may be present.

If a new carbonyl group has been added in the $\alpha$-position to the double bond of the side chain, the compound is allowed to react with agents which are capable of converting this carbonyl group —CO— into the group —CY(OH) wherein Y may be, as above, hydrogen or an alkyl radical. Such agents are, reducing agents in the broadest sense, further also metallic hydrocarbon compounds such as Grignard reagents, alkali hydrocarbons etc. which are capable, in addition to reducing the carbonyl group, of introducing an alkyl radical into the same position.

Finally the compound may be treated with lactonizing, e. g. acid agents. Such a subsequent treatment is particularly advantageous if, after oxidation or reduction, lactonization did not occur or occured only incompletely and the hydroxyl or carboxyl group in the side chain is free. Otherwise when the hydroxyl and carboxyl groups are not free hydrolysis, as already mentioned, is necessary. In the presence of a substituted hydroxyl or carboxyl group lactonization can also take place by means of reesterification.

The products of the reaction formed by the new process have in the nucleus or in a side chain generally a substituent of the formula

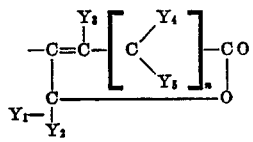

The substituent may also have for instance the formula

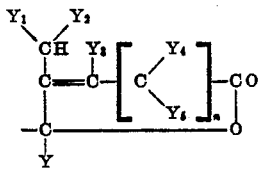

as the starting products used always possess a number of active positions and therefore the oxidation may affect another carbon atom than that to which $Y_1$ and $Y_2$ are attached. In these formulas Y, $Y_1$ to $Y_5$ and $n$ have the significance already mentioned. In the course of the reaction there may be a displacement of the double bond toward the lactone carbonyl group.

By the above process 5, 6 or more membered lactones can be prepared. The first two groups are of special interest, as they are related to or identical with the aglucones of the digitalis and scilla glucosides and toad poisons.

The following examples illustrate the invention but are not to be regarded as limiting it in any way.

*Example 1*

4 g. $\Delta^{20,22}$-3-acetoxy-nor-allocholenic acid methyl ester, melting point 154–156° C. (which is easily obtainable, for example, from 3-hydroxy-allopreghanone-(20) by reacting with bromoacetic acid methyl ester—Reformatzky's method—and subsequent elimination of water) are dissolved in 300 ccm. of acetic anhydride and a solution of 4 g. selenium dioxide in 20 ccm. of water added drop by drop to the boiling solution. The separation of selenium begins momentarily. After boiling under reflux for several hours, the solution is concentrated down in vacuo to 50 ccm. The precipitated selenium is filtered off, the filtrate poured into water and boiled up for a short time. After cooling, the separation products of the reaction are dissolved in ether. The ether is evaporated off and the residue subjected to distillation in a high vacuum. The distillate is dissolved in benzene, treated with animal charcoal and chromatographed over aluminium oxide to remove the last traces of selenium or components containing selenium. The main fraction of the chromatogram crystallizes after the addition of methyl alcohol. After recrystallizing from alcohol, the product melts at 193° C. The product obtained is $\Delta^{20,22}$-3-acetoxy-21-hydroxy-nor-allocholenic acid lactone which has a specific rotation of $[\alpha]_D = -1.0°$ (in chloroform).

The general reactions above involved may be graphically represented as follows:

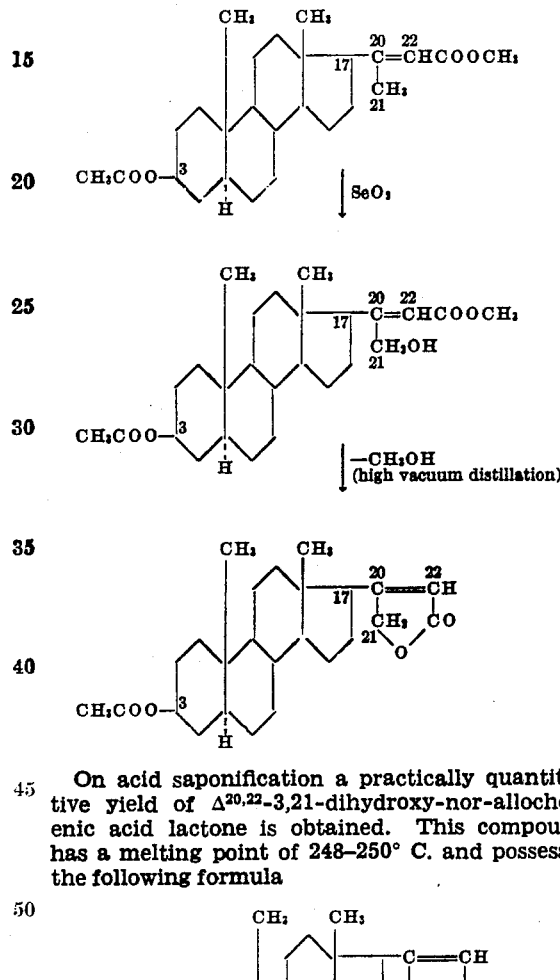

On acid saponification a practically quantitative yield of $\Delta^{20,22}$-3,21-dihydroxy-nor-allocholenic acid lactone is obtained. This compound has a melting point of 248–250° C. and possesses the following formula Both products give a positive reaction to the legal test. From a $\Delta^{20,22}$-3-acyloxy-allocholenic acid ester or the corresponding 25-homo-cholenic acid ester there are obtained in a similar way a $\Delta^{20,22}$-3-acyloxy-21-hydroxy-allocholenic acid lactone and the $\Delta^{20,22}$-3,21-dihydroxy-allocholenic acid lactone or the corresponding 25-homo-cholenic acid lactones.

*Example 2*

5.0 g. $\Delta^{5,6},\Delta^{20,22}$-acetoxy-21-methyl-nor-choladienic acid methyl ester (which is obtainable for example from $\Delta^{5,6}$-3-hydroxy-21-methyl-pregnenone-(20) by reacting with bromoacetic acid methyl ester—Reformatzky's method—and subsequent elimination of water) are dissolved in 20 ccm. of acetic acid (stable to chromic acid) and 10 ccm. acetic anhydride and warmed with 3.0 g. lead tetra-acetate on a water bath. Water and dilute sulphuric acid are then added to the reaction mixture and boiled up for a short time to complete lactonization. The product of the reaction is then dissolved in ether, the ether evaporated off, the residue dissolved in a mixture of benzene and petroleum ether, and the solution chromatographed over aluminium oxide. In this way $\Delta^{5,6}, \Delta^{20,22}$-3-acetoxy-21-methyl-21-hydroxy-nor-choladienic acid lactone is obtained of the formula

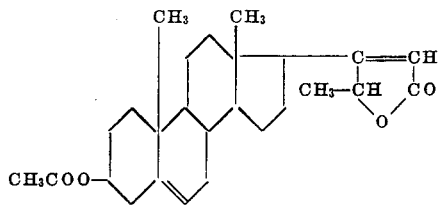

together with a little of the unchanged starting product.

When using as starting material $\Delta^{5,6; 20,22}$-3-acetoxy - 21,22 - dimethyl-nor-choladienic acid methyl ester (which is obtained for example from $\Delta^{5,6}$-3-oxy-21-methyl-pregnenone-(20) by reacting with α-bromo-propionic acid methyl ester—Reformatzky's method—and subsequent elimination of water by means of acetic acid anhydride) there is obtained in a similar way $\Delta^{5,6; 20,22}$ - 3 - acetoxy - 21,-22-dimethyl-21-hydroxy-nor-choladienic acid lactone

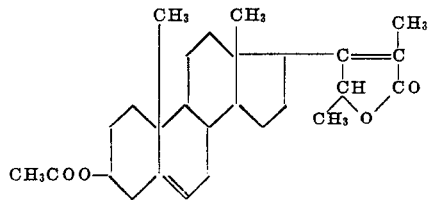

Furthermore starting from a $\Delta^{20,22}$-3,7,12-triacetoxy-nor-cholenic acid ester or $\Delta^{20,22}$-3,12-diacetoxy-nor-cholenic acid ester there can be obtained the corresponding $\Delta^{20,22}$-3,7,12-triacetoxy-21-hydroxy-nor-cholenic acid lactone or $\Delta^{20,22}$-3,12 - diacetoxy - 21-hydroxy-nor-cholenic acid lactone. Instead of the acid esters one can always start from the free acids or from derivatives such as the amides or nitriles.

*Example 3*

5 gr. of $\Delta^{5:6; 25:26}$-acetoxy-26-methylcholestadiene-26-carboxylic acid (obtained from norcholestene-3-ol-25-one [Helv. Chim. Acta, vol. 20, page 1294 and 1937] by reaction with α-bromopropionic acid ethylester according to Reformatzky and splitting off water) are converted in chloroform solution with phosphorus trichloride into acid chloride and subsequently treated with an excess of bromine. In addition to the saturation of the $\Delta^{5:6}$-double bond there occurs also an oxidation of the C-atom in the γ-position to the carboxyl. After evaporating the chloroform, the product of the bromination is taken up in acetone and cautiously debrominated with zinc dust. The whole is filtered to remove the unchanged zinc dust, the reaction product is taken up in ether, washed with much water and acetylated. By chromatographic purification there is obtained a fraction having a position legal test which is a mixture of $\Delta^{5:6; 25:26}$-3-acetoxy-24-hydroxy-26-methyl-cholestadiene-26-carboxylic acid-lactone of the Formula I and $\Delta^{5:6; 25:26}$-3-acetoxy-27-hydroxy-26-methyl-cholestadiene-26-carboxylic acid-lactone of the Formula II

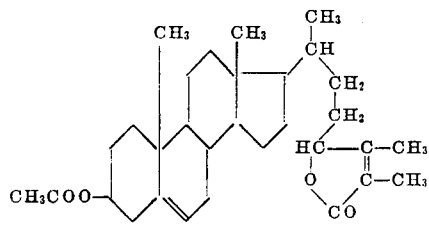

I

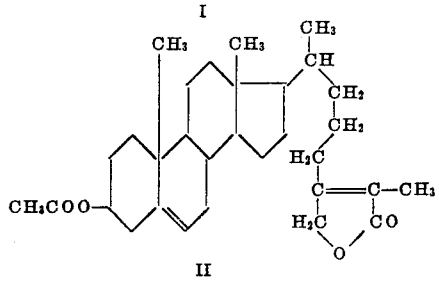

II

The two lactones can be separated according to the usual methods.

The same products are also obtained when using as starting material the nitrile of the $\Delta^{5:6; 25:26}$-3-acetoxy-26-methyl-cholestadiene - 26-carboxylic acid.

What I claim is:

1. The compounds of the 10:13-dimethyl-cyclopentanopolyhydrophenanthrene series having in the 17-position a member of the group consisting of a substituent of the formula

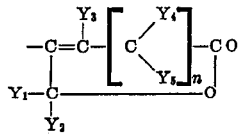

and of a side chain containing such substituent, wherein $Y_1$, $Y_2$, $Y_4$ and $Y_5$ each represents a member of the group consisting of hydrogen and a hydrocarbon radical, $Y_3$ represents a hydrocarbon radical, and $n$ stands for one of the numbers 0, 1 and 2, and wherein the cyclopentanopolyhydrophenanthrene nucleus is free from tertiary hydroxyl groups.

2. Compounds of the cyclopentanopolyhydrophenanthrene series having in 17-position a substituent of the formula

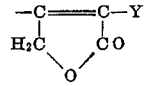

wherein Y is an alkyl group.

3. In a process for the manufacture of a lactone of the cyclopentanopolyhydrophenanthrene series, the step of treating a compound of the said series having in the 17-position a member of the group consisting of a substituent of the formula

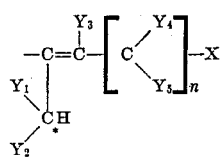

and a side chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represent a member of the group consisting of hydrogen and a hydrocarbon radical, with an oxidizing agent capable of introducing into the α-position (*) with respect to a double bond a member of the group consisting of oxygen, a free hydroxyl group and a group which upon hydrolysis is converted into a hydroxyl group.

4. In a process for the manufacture of a lactone of the cyclopentanopolyhydrophenanthrene series, the step of treating a compound of the said series having in the 17-position a member of the group consisting of substituent of the formula

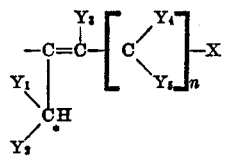

and a sid chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represent a member of the group consisting of hydrogen and a hydrocarbon radical, with an oxidizing agent capable of introducing oxygen into the α-position (*) with respect to a double bond.

5. In a process for the manufacture of a lactone of the 10,13-dimethyl-cyclopentanopolyhydrophenanthrene series, the step of treating a compound of the said series having in the 17-position a member of the group consisting of a substituent of the formula

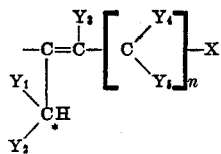

and a side chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represent a member of the group consisting of hydrogen and a hydrocarbon radical, with an oxidizing agent capable of introducing oxygen into the α-position (*) with respect to a double bond.

6. In a process for the manufacture of a lactone of the 10,13-dimethyl-cyclopentanopolyhydrophenanthrene series, the steps of treating a compound of the said series having in the 17-position a member of the group consisting of a substituent of the formula

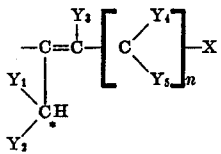

and a side chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represent a member of the group consisting of hydrogen and a hydrocarbon radical, with an oxidizing agent capable of introducing oxygen into the α-position (*) with respect to a double bond, and then subjecting the resultant product to the action of an agent capable of transforming a —CO— group into a —CY(OH)— group, wherein Y represents a member of the group consisting of hydrogen and alkyl.

7. A process for the manufacture of a lactone of the 10,13-dimethyl-cyclopentanopolyhydrophenanthrene series, which comprises treating a compound of the said series having in the 17-position a member of the group consisting of a substituent of the formula

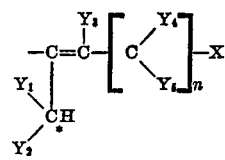

and a side chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represents a member of the group consisting of hydrogen and a hydrocarbon radical, with an oxidizing agent capable of introducing oxygen into the α-position (*) with respect to a double bond, and then subjecting the resultant product to the action of an agent capable of transforming a —CO— group into a —CY(OH)— group, wherein Y represents a member of the group consisting of hydrogen and alkyl, and to the action of a lactonizing agent.

8. A process for the manufacture of a lactone of the 10,13-dimethyl-cyclopentanopolyhydrophenanthrene series, which comprises treating a compound of the said series having in the 17-position a member of the group consisting of a substituent of the formula and a side chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represents a member of the group consisting of hydrogen and a hydrocarbon radical, with an oxidizing agent capable of introducing oxygen into the α-position (*) with respect to a double bond, and then subjecting the resultant product to the action of an agent capable of transforming a —CO— group into a —CY(OH)— group, wherein Y represents a member of the group consisting of hydrogen and alkyl, and to the action of a hydrolyzing agent and a lactonizing agent.

9. A process for the manufacture of a lactone of the 10,13-dimethyl-cyclopentanopolyhydrophenanthrene series, which comprises treating a compound of the said series having in the 17-position a member of the group consisting of a substituent of the formula

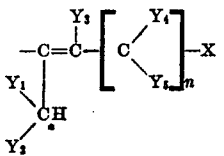

and a side chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represents a member of the group consisting of hydrogen and a hydrocarbon radical, with an oxidizing agent capable of introducing oxygen into the α-position (*) with respect to a double bond, and then subjecting the resultant product to the action of an agent capable of transforming a —CO— group into —CY(OH)— group, wherein Y represents a member of the group consisting of hydrogen and alkyl, and to the action of a hydrolyzing agent, a lactonizing agent and a re-esterifying agent.

10. In a process for the manufacture of a lactone of the cyclopentanopolyhydrophenanthrene series, the step of treating a compound of the said series having in the 17-position a member of the group consisting of a substituent of the formula

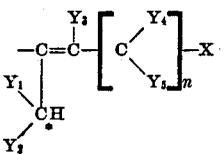

and a side chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represent a member of the group consisting of hydrogen and a hydrocarbon radical, with an oxidizing agent capable of introducing a hydroxyl group into the α-position (*) with respect to a double bond.

11. In a process for the manufacture of a lactone of the cyclopentanopolyhydrophenanthrene series, the step of treating a compound of the said series having in the 17-position a member of the group consisting of a substituent of the formula

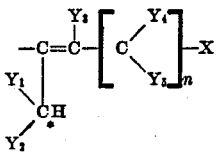

and a side chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represent a member of the group consisting of hydrogen and a hydrocarbon radical, with an oxidizing agent capable of introducing a group which upon hydrolysis is converted into a hydroxyl group into the α-position (*) with respect to a double bond.

12. A process for the manufacture of a lactone of the 10,13-dimethyl-cyclopentanopolyhydrophenanthrene series, which comprises treating a compound of the said series having in the 17-position a member of the group consisting of a substituent of the formula

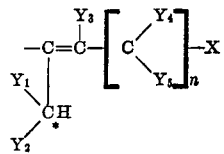

and a side chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represents a member of the group consisting of hydrogen and a hydrocarbon radical, with an oxidizing agent capable of introducing oxygen into the α-position (*) with respect to a double bond, and then subjecting the resultant product to the action of an agent capable of transforming a —CO— group into a —CY(OH)— group, wherein Y represents a member of the group consisting of hydrogen and alkyl, and to the action of lactonizing means.

13. A process for the manufacture of a lactone of the 10,13-dimethyl-cyclopentanopolyhydrophenanthrene series, which comprises treating a compound of the said series having in the 17-position a member of the group consisting of a substituent of the formula

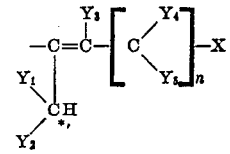

and a side chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represents a member of the group consisting of hydrogen and a hydrocarbon radical, with an oxidizing agent capable of introducing a free hydroxyl group into the α-position (*) with respect to a double bond, and then subjecting the resultant product to the action of lactonizing means.

14. A process for the manufacture of a lactone of the 10,13-dimethyl-cyclopentanopolyhydrophenanthrene series, which comprises treating a compound of the said series having in the 17-position a member of the group consisting of a substituent of the formula

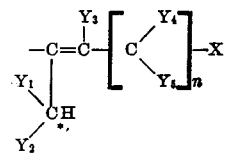

and a side chain which contains such substituent, wherein $n$ stands for one of the numbers 0, 1 and 2, X represents a member selected from the class consisting of a carboxylic acid group, a carboxylic acid ester group, a carboxylic acid amide group, and a nitrile group, and $Y_1$, $Y_2$, $Y_3$, $Y_4$ and $Y_5$ each represents a member of the group consisting of hydrogen and a hydrocarbon radical, with an oxidizing agent capable of introducing into the $\alpha$-position (*) with respect to a double bond a group which upon hydrolysis is converted into a hydroxyl group, and then subjecting the resultant product to the action of lactonizing means.

15. In a process for the manufacture of a lactone of the 10,13-dimethyl-cyclopentanopolyhydrophenanthrene series, the step of treating a functional carboxylic acid derivative of a $\Delta^{20,22}$-3-acyloxy-nor-allocholenic acid with an oxidizing agent capable of introducing a hydroxyl group into the $\alpha$-position of a double bond.

16. In a process for the manufacture of a lactone of the 10,13-dimethyl-cyclopentanopolyhydrophenanthrene series, the step of reacting $\Delta^{20,22}$-3-acetoxy-nor-allocholenic acid methyl ester with selenium dioxide.

17. The $\Delta^{5,6}$;$^{20,22}$-3-acetoxy-21,22-dimethyl-21-hydroxy-nor-choladienic acid lactone of the formula

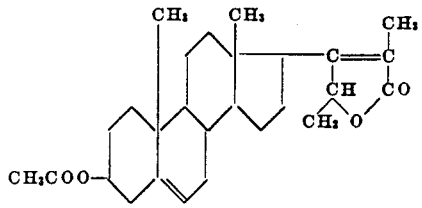

18. The $\Delta^{5,6}$;$^{25,26}$-3-acetoxy - 27 - hydroxy - 26 - methyl-cholestadiene-26-carboxylic acid lactone of the formula

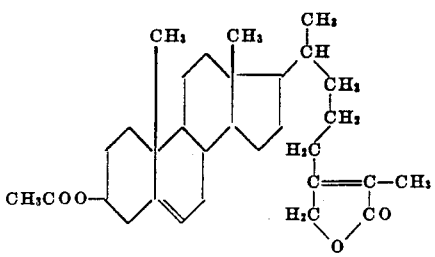

LEOPOLD RUZICKA.